(12) United States Patent
Reissner et al.

(10) Patent No.: US 12,188,828 B2
(45) Date of Patent: Jan. 7, 2025

(54) PROCESS CONTROL METHOD FOR A 3D-PRINTING PROCESS

(71) Applicant: Ivoclar Vivadent AG, Schaan (LI)

(72) Inventors: Joachim Reissner, Nüziders (AT); Jörg Ebert, Buchs (CH); Lorenz Josef Bonderer, Sargans (CH)

(73) Assignee: Ivoclar Vivadent AG, Schaan (LI)

( * ) Notice: Subject to any disclaimer, the term of this patent is extended or adjusted under 35 U.S.C. 154(b) by 338 days.

(21) Appl. No.: 17/498,816

(22) Filed: Oct. 12, 2021

(65) Prior Publication Data
US 2023/0152160 A1 May 18, 2023

(30) Foreign Application Priority Data
Oct. 15, 2020 (EP) .................................... 20201987

(51) Int. Cl.
*G01J 5/08* (2022.01)
*B29C 64/124* (2017.01)
(Continued)

(52) U.S. Cl.
CPC .......... *G01J 5/0859* (2013.01); *B29C 64/124* (2017.08); *B29C 64/245* (2017.08);
(Continued)

(58) Field of Classification Search
CPC ... B29C 64/264; B29C 64/268; B29C 64/273; B29C 64/277; B29C 64/282;
(Continued)

(56) References Cited

U.S. PATENT DOCUMENTS

| 10,836,102 B2 | 11/2020 | Meinders et al. |
| 2018/0133959 A1 | 5/2018 | Moore et al. |

(Continued)

FOREIGN PATENT DOCUMENTS

| CN | 103895227 A | 7/2014 |
| CN | 111002583 A | 4/2020 |

(Continued)

OTHER PUBLICATIONS

ATSM International, https://www.astm.org/Standards/ISOASTM52900.htm, "Standard Terminology for Additive Manufacturing—General Principles—Terminology," Article, West Conshohocken, PA, 2015.

*Primary Examiner* — Jamel M Nelson
(74) *Attorney, Agent, or Firm* — Ann M. Knab; Thad McMurray

(57) ABSTRACT

A process control method for a 3D-printing process using a 3D printer. The 3D printer has a build platform, a light source, a receiving device for printing material and a control device by which an object can be produced layer-wise or continuously from the printing material. The method includes using a thermal imaging camera, the output signal of which is transmitted to the control device, connected to the 3D printer, The method includes the following steps:
illuminating a layer or parts of said layer positionally selectively,
detecting the temperature of the layer during the polymerisation using the thermal imaging camera,
ending the building process of a layer by ending the illumination, the time of the end of the illumination being established by a predefined temperature $T_{max}$ or a predefined change in temperature $dT/dt$ being reached.

22 Claims, 4 Drawing Sheets

(51) Int. Cl.
*B29C 64/245* (2017.01)
*B29C 64/264* (2017.01)
*B29C 64/393* (2017.01)
*B33Y 10/00* (2015.01)
*B33Y 30/00* (2015.01)
*B33Y 50/02* (2015.01)
*G01J 5/00* (2022.01)

(52) U.S. Cl.
CPC .......... *B29C 64/264* (2017.08); *B29C 64/393* (2017.08); *B33Y 10/00* (2014.12); *B33Y 30/00* (2014.12); *B33Y 50/02* (2014.12); *G01J 2005/0077* (2013.01)

(58) Field of Classification Search
CPC ... B29C 64/286; B29C 64/291; B29C 64/393; B29C 64/124; B29C 64/129; B29C 64/135; B33Y 10/00; B33Y 30/00; B33Y 50/02
See application file for complete search history.

(56) References Cited

U.S. PATENT DOCUMENTS

| | | |
|---|---|---|
| 2018/0186080 A1 | 7/2018 | Milshtein et al. |
| 2018/0229304 A1 | 8/2018 | Zettner |
| 2019/0016050 A1 | 1/2019 | Stadlmann |
| 2019/0212572 A1 | 7/2019 | Tomioka |
| 2019/0275741 A1 | 9/2019 | Chang |
| 2020/0055251 A1* | 2/2020 | Medalsy ................ B29C 64/20 |

FOREIGN PATENT DOCUMENTS

| | | |
|---|---|---|
| CN | 111016163 A | 4/2020 |
| JP | 2010179496 A | 8/2010 |
| JP | 2018051958 A | 4/2018 |
| WO | 2017100695 A1 | 6/2017 |
| WO | 2018006018 A1 | 1/2018 |

* cited by examiner

PROCESS CONTROL METHOD FOR A 3D-PRINTING PROCESS

CROSS-REFERENCE TO RELATED APPLICATIONS

This application claims priority to European patent application No. 20201987.3 filed on Oct. 15, 2020, the disclosure of which is incorporated herein by reference in its entirety.

TECHNICAL FIELD

The invention relates to a process control method for a 3D-printing process and to a 3D printer comprising a build platform.

BACKGROUND

According to current prior art, in a 3D-printing process of this type, stereolithography and/or a DLP process (digital light processing process), the components are produced from special printable plastic or polymeric material, which is in liquid form and is treated with light and cured by selective illumination in layers, generally of a low thickness such as 0.1 or 0.05 mm.

Typically, the light is passed through a transparent film and, after the relevant layer is finished, the film is detached from the component or the component is removed from the film.

Recently, it has become known to use stereolithography devices and/or DLP (digital light processing) processes for dental technology, in particular for producing dental restoration parts.

It will be appreciated that components of this type must be biocompatible and that high requirements are and have to be placed on oral compatibility.

To make a 3D-printing process of this type as efficient as possible, the progress of the process has to be tracked. This enables a minimal printing time with optimal curing and thus provides the best benefit-cost ratio.

Monitoring the surface in fine metal powder sintering processes by temperature measurement using a thermal imaging camera is known from "Layerwise Monitoring of the Selective Laser Melting Process by Thermography" by Krauss et al.

A stereolithography process or digital light processing process in which a photosensitive material is cured by radiation, and the measurement radiation is fed into a reference layer and mostly remains within the reference layer as a result of internal reflection, and the measurement radiation is detected in a spatially and temporally resolved manner by a sensor, is known from WO 2017/106895 A1 and corresponding US 20190016050 A1, which US publication is hereby incorporated by reference in its entirety. In this context, the radiation is spatially and temporally resolved using a complicated construction. This construction is highly cost-intensive and thus ill-suited to dental technology. Moreover, in this solution it is not possible to establish when the optimal time is to end the illumination.

SUMMARY

The object of the invention is therefore to create a simple method for process control of a 3D-printing process and a 3D printer comprising a build platform, in accordance with the claims, which make it possible to obtain the best possible printing result with minimum time expenditure.

According to the method of the invention for process control of a 3D-printing process, a thermal imaging camera is attached to a 3D printer or connected to the control device of the 3D printer. The output signal thereof is transmitted to the control device.

According to the invention, the 3D printer includes a build platform, a light source, a receiving device for printing material, a thermal imaging camera and a control device. A preferred application possibility includes stereolithography processes and digital light processing processes.

The receiving device includes a trough, which may be upwardly open or open at the top or is at least open to the build platform.

For example, a monomer or monomer mixture and a photoinitiator are placed in this receiving device or receptacle for printing material. Other starting solutions such as a photosensitive monomer/monomer mix or a diluted monomer solution are possible.

The receiving device has a glass plate as a base and a transparent or translucent layer, for example, a film, thereon. An inhibitor layer, which prevents adhesion of the printing material upon curing or polymerisation, may be applied to this film.

According to the invention, a build platform is introduced or inserted into the printing material, so that it is immersed in the printing material and reaches almost as far as the transparent film of the receiving device. In order to achieve a defined distance between the base film and the build platform, the build platform can be lowered until it comes into contact with the base film and is subsequently raised by the desired defined value. Between the base film and the build platform, there is thus a monomer layer of a defined thickness, which can subsequently be exposed or illuminated in a location-selective manner. This layer may, for example, be between 50 and 100 μm thick.

A typical cycle of a printing process of this type lasts approximately 10 seconds, the illumination by the light source accounting for 2 seconds of this time period.

In a preferred embodiment of the invention, the object is produced in layers. This means that after the exposure of a layer, the build platform is raised so that printing material can flow into the resulting gap, and then the material is exposed or illuminated. For larger printed objects, the build platform is initially raised by more than one layer thickness, preferably by approximately 1 cm, so that the illuminated layer can detach from the film better and printed material can flow into the resulting gap. The build platform is then lowered again to the desired height, so that the desired layer thickness is achieved between the build platform and the film. Thus, in each illumination step, the object to be printed is enlarged by one further layer of the cured printing material.

It is particularly advantageous if the build platform is raised asymmetrically. For example, lifting of the build platform can start at one side or one corner. This allows the building material to detach better from the film. The shear forces are lower, and so there is only a low probability that the film will tear. In addition, the service life of the film is increased since weaker forces act on it than if the build platform were raised vertically upwards. In layer-wise production of the object, printing can be carried out at a building rate of approximately 0.5 mm/min.

To reduce the shear forces, it is also conceivable for the device to be embodied in such a way that, during the detachment process of the layer which has been built, the build platform is displaced vertically and the trough moves horizontally. Alternatively, they may also move at a slightly inclined angle to the horizontal.

In a further advantageous embodiment, the object may also be produced continuously. In this context, the transparent layer of the trough or tray of the 3D printer, which comes into contact with the printing material, is protected against adhesion of the curing printing material by an inhibitor layer. An advantage of this embodiment is that formed layers do not have to be detached from a film individually, but instead the build platform is raised continuously during the illumination, at a defined speed, for example 10 mm/min. However, this requires a higher power of the light source than layer-wise production. Thus, an end product is achieved which does not allow individual layers to be perceived but rather has a homogeneously smooth surface. Moreover, this method makes it possible to accelerate the printing process and thus to reduce the production time, with an accompanying minimisation of the production costs.

The light source, which is mounted, for example, centrally below the transparent layer of the receiving device, can, for example, be a high-precision laser, which emits the optimum wavelength as appropriate for the relevant photoinitiator, or else is preferably an LED light source. This is directed onto the transparent or translucent bottom or base of the trough or tray, and thus onto the base film of the receiving device, and can thus illuminate the printing material from below/outside through the transparent or translucent film. Said material preferably cures between the build platform, or the layer already solidified or partially solidified in the previous illumination process, and the transparent film, and adheres to the build platform or the preceding layer, but not to the transparent film.

In this step, the layer is illuminated at selective positions. This may take place either along the entire surface of the layer or only in selected parts of the layer, such as a two-dimensional pattern.

Due to the light energy of the light source, the site-selective, exothermic polymerization starts only at the exposed areas because of the photoinitiator or the photo-sensitive polymer.

According to the invention, during the illumination process and thus during the polymerisation at the illuminated points, the temperature of the entire layer, i.e., the thermal radiation of the layer, is tracked or continuously monitored in a spatially resolved manner using a thermal imaging camera. The thermal imaging camera is preferably located to the side, below the receiving device, and is directed onto the transparent or translucent base film.

For this purpose, the thermal imaging camera is directed onto the lower surface of the light-transmitting film, in particular, the illuminated region of this film, which is, for example, approximately a few square centimetres (1-10 cm$^2$) for dental technology applications. Such thermal imaging cameras detect the heat emission over the entire surface at a spatial resolution of a few hundredths of a square millimeter with temporal resolution during (a few seconds) and between exposures (approximately 1 minute). The data obtained from such a temporal resolution temperature measurement of this type over an exposed area corresponds to a three-dimensional Gauss distribution of the measured temperature curves. The control device can thus compute a time-resolved 2-dimensional temperature distribution over the entire surface of the film from the values measured by the thermal imaging camera, while taking into account the thermal conductivity and heat capacity of the materials used (printing material and printer construction materials).

On the one hand, the thermal imaging camera detects the part of the light energy that leads to the heating of the surface. However, this is approximately constant over the entire exposure process and is subtracted by the control device.

Furthermore, the thermal imaging camera detects the energy arising during the exothermic polymerisation of the material. The measured temperature at the surface thus corresponds to the emission of particular wavelengths and wavelength ranges of the illuminated surface. This is detected/recorded by the thermal image camera using temporal resolution.

The change in temperature dT/dt thus corresponds to the first derivative of the temperature curve. A positive change in temperature (dT/dt>0) represents heating (heat of emission) and a negative change in temperature (dT/dt<0) represents cooling (coldness of emission) of the surface. A constant temperature, i.e., no change in temperature (dT/dt=0), means a constant surface temperature or a maximum/minimum of the temperature curve ($T_{max}$ or $T_{min}$).

The temperature change over the film surface is recorded with spatial resolution by the thermal imaging camera and fed to the control device.

In an advantageous embodiment, the integral of the temperature curve, i.e., the amount of heat or heat quantity, is recorded with spatial resolution.

The time of the end of the illumination is established by a predefined temperature $T_{max}$ or a predefined change in temperature dT/dt being reached. If this temperature or change in temperature is measured by the thermal imaging camera and detected by the control device, the control device emits a signal. The control device subsequently ends the building process of this layer by ending the illumination.

Further, it is possible that, as a result of an undesired, inhomogeneous temperature distribution being measured, particular regions of the layer may continue to be illuminated while other parts are no longer illuminated, since the curing has already taken place satisfactorily at these points. The desired polymerisation rate can thus be achieved in all regions.

The predefined temperature $T_{max}$ is established as the maximum desired heating temperature detected at the surface of the polymerising layer by the thermal imaging camera. The change in temperature dT/dt at this time converges towards zero or in particular has a zero value. Since it is difficult to track the change in temperature as far as the zero value in a finite time period, it is also possible to work with a defined threshold (for example dT/dt=2 to 5 K/s).

This monitoring of the spatially resolved temperature progression can prevent damage to or undesired polymerisation of the surrounding material due to overexposure. Preferably, the illumination is ended as soon as a desired predefined degree of curing is achieved, since in the event of excessive or even complete polymerisation of the monomers the adhesion of the next layer would be reduced. Moreover, the LEDs and LED-DM Ds or other light sources used as a light source each have a limited, specific luminous period. Thus, as a result of the monitoring of the spatially resolved temperature progression, the optimum illumination duration can be determined and unnecessarily long illumination can be prevented, which would otherwise reduce the service life of the light source unnecessarily.

After the illumination ends, the layer has to be released from the film. This is performed, for example, by raising the build platform by a certain amount.

This amount must be at least, for example, the layer thickness of a printing process. However, it is preferred initially to raise the build platform by a larger amount so as to facilitate complete detachment, and subsequently to lower it to the desired layer thickness (for example 50 to 100 mm). It is further conceivable to lower the film down. For this purpose, it is advantageous to lower the film diagonally with the trough, in other words starting at one side, in such a way that the film is in effect detached from the cured printing material.

In a continuous printing process, the inhibitor layer prevents adhesion of the cured printing material to the transparent film. This makes a detachment process of this type superfluous.

Overexposure in a 3D stereolithography process or a digital light processing process also leads to excessively strong adhesion between the material and the film and an unnecessarily prolonged printing process. This can be avoided using the method according to the invention, since the optimum illumination duration is determined using the temperature tracking by the thermal imaging camera. Aside from the aforementioned conservation of the light source, this also provides for an increased service life of the transparent film as well as a time savings advantage. The excess adhesion can lead to damage, scratches, or detachment of the inhibitor layer and/or to scratches, damage or even tearing of the film, or both. Once damage of this type has occurred, it can only be eliminated by interrupting the printing process, or said process may even have to be aborted entirely, since otherwise building errors will be left in the final product.

Upon detachment, new material to be polymerised enters the resulting gap. This can be detected by the thermal imaging camera as a sharp drop in the measured heat emission, i.e., a drop in the temperature (change in temperature $dT/dt<<0$). After detachment and after the first abrupt drop in temperature when printing material flows in for the first time, any further material flow with or without gas bubbles between the build platform and the film can be detected by the thermal imaging camera as a change in temperature in each case ($dT/dt>0$ or $dT/dt<0$) and recognised in the control device.

Further, it is favourable that impurities on the film with or without an inhibitor layer—for example due to sedimentation, contamination, adhesion of residues from any erroneous building process or of foreign particles—can be detected. Cases of this type can be detected, for example, during a movement of the build platform when an excessively small change in temperature is detected by the thermal imaging camera and recognised in the control device. This applies not only in the event of an excessively small change in temperature over the entire film surface, but also on partial surfaces or sub-areas, i.e., when it is recorded by the thermal imaging camera that the temperature distribution/change is not plausible over the entire film surface. The control device subsequently emits a warning signal.

This is particularly important if gas bubbles or small impurities are left behind on the film or on the inhibitor layer, in particular between the object and the film or inhibitor layer. This is detected because the temperature is lower at the location of a gas bubble than in the surrounding area. The thermal imaging camera detects the temperature with spatial resolution and in a high-precision manner, in such a way that the control device can detect temperature differences of this type and thus output an error signal or warning signal.

The spatial resolution of the thermal imaging camera is preferably in the range of the layer thickness of the building process, i.e., approximately 0.1 mm×0.1 mm, but may also be much greater, for example ten times greater, in other words 1 mm×1 mm, or much smaller, for example 0.025× 0.025 mm.

The control device only triggers the illumination process of a following step when these faults have been eliminated or the user triggers the illumination manually. The faults are recognised as eliminated when the thermal imaging camera registers and the control device detects that there are no gas bubbles or impurities remaining on the film. This can be detected from the thermal imaging camera measuring a homogeneous change in temperature over the entire surface during a material flow. In this case, the control device detects no irregularities in the change in temperature, and thus detects that there are no impurities or gas bubbles adhering to the surface of the film. Once the inward flow of new printing material is ended, i.e., once the material flow is ended, the thermal imaging camera measures a constant temperature over the entire surface of the film. The control device thus verifies its results during material flow, and can check whether there are really no impurities or gas bubbles left on the surface of the film.

A further embodiment provides that if disruptive factors are detected the entire printing process is aborted.

Moreover, the control device only triggers the illumination process of the next step once the thermal imaging camera has recorded and the control device has recognised that, after a change in temperature exceeding a predetermined threshold, corresponding to a material flow, no further significant change in temperature ($dT/dt$ converges towards 0) is measurable. This means that the entirety of the cured material has been detached from the film surface and the material flow is approaching a standstill.

In an advantageous development, the control device outputs a warning signal or error signal when the thermal imaging camera records and the control device detects that the heat emission, at the start of the illumination, does not change within a predefined time, preferably 2 seconds. This would mean that the light source has failed, the illuminated layer is already fully cured, or the polymerisation has not been started up due to some other source of error. It is also possible, for example, that the layer has not completely separated from the film, the film has torn, or the printing material has been used up.

Thus, by monitoring the temperature progression during the polymerisation process and also between the illumination of different layers, most errors during the 3D-printing process, for example, contamination of the film, deposits of foreign bodies, incomplete detachment of the object from the film or aging of the film, LED or LED-DMD, can be detected at an early stage.

As a result, when a warning signal is issued, the illumination process is delayed, in particular, paused or aborted, by the control device. The building process of the next layers can be adjusted, for example, automatically by the control device or by user intervention, to minimise damage. When a warning signal is issued during an illumination process, it is also possible to restart the current illumination of the layer, such that, for example, if the light source fails, the illumination process can be continued after it has been checked and repaired, without obtaining a defective layer in the end product.

In an advantageous embodiment, the dimensions of the illuminated layer of the 3D-printed object can be tracked during polymerisation multi-dimensionally, in particular, by a two-dimensionally spatially resolved temperature measurement. For this purpose, the heat emission of the surface of the light-transmitting film is tracked and recorded with a thermal imaging camera during the printing process, in particular during both the exposure and between the exposures. The exposed areas emit more heat than the remaining areas. This is caused both by the incoming light energy of the light source and by the heat occurring during the exothermic polymerization process. Thus, the control device can calculate the actual dimensions of the illuminated layer from the data determined by the thermal imaging camera and compare them with the theoretical values, i.e., the raw data before exposure, which were supplied to the light source.

To monitor and check the printing process, the dimensions of the exposed parts of the film are determined with the thermal imaging camera during each exposure process and stored by the control device. This data can then be compared with each other and with the raw data.

If the dimensions of an illuminated layer decrease by comparison with the previous layer, it can be assumed that the illuminated region is being reduced. Otherwise, if the dimensions of the illuminated layer increase, it can be assumed that said region is being enlarged. This is important, in particular, in the event of very large differences between the layers. The large difference indicates an error in the building process. If an unexpectedly large change of this type in the illuminated area is measured between two or more layers, the control device outputs a warning signal, in particular, an error signal.

Until now, in 3D-printing methods, it has been necessary to carry out distortion correction so as to compensate for the shift in the individual layers with respect to one another during the printing process. According to the invention, this distortion correction is now superfluous as a result of the monitoring of the increase or decrease in area of the printed layer of a 3D object to be produced, since the size of the object is tracked during the polymerisation and the building process can be adapted accordingly. When a warning signal of the control device is issued, the user, or optionally, the control device automatically, can decide whether or not the large increase or decrease in area was intended. If it was not intended, the source of the error can be eliminated. If a layer is too small, the desired region of this erroneous layer can then be re-exposed to achieve optimum curing of the desired area. In the event of unintended excessive illumination, the error is more difficult to eliminate. In this context, after the source of error is removed, the next layer can be printed without error, and after the end of the printing process, the remaining undesired parts can be removed by the user by hand. This may take place, for example, by using a conventional hand sander.

The 3D printer according to the invention consists of a build platform, a light source, a receiving device for the printing material, a control device and an attached thermal imaging camera. The thermal imaging camera transfers the output signal thereof to the control device.

The control device can be, for example, a computer with special software that controls or actuates the 3D-printing unit in such a way that an object made from the printing material can be produced layer-wise or continuously, as described above.

In a further embodiment according to the invention, a DMD unit is connected to the 3D printer. If the thermal imaging camera and the control device recognise that a layer is curing unevenly or nonuniformly, the DMD unit can be used to deflect the radiation from the areas that have already cured. Thus, the regions which are not yet fully cured continue to be illuminated, and at the same time overexposure of the already fully cured regions is prevented.

This process is based on the projection technology of digital light processing (DLP). In this context, images, or in this case, light rays having a defined light energy, are produced by modulating a digital image, or wavelengths of defined energies, onto a light ray. The light ray is split by an arrangement of movable micromirrors into individual image points or pixels, and subsequently individually reflected either into or out of the projection path. This allows very precise and fine control of the light rays onto the desired regions of the lower surface of the transparent film, in such a way that overexposure of individual regions can be prevented.

This arrangement of movable micromirrors, including their control or actuation technology is referred to as a DMD (digital micromirror device) unit. Preferably, the individual micromirrors of a DMD unit are arranged in the form of a square matrix, and can be individually controlled or tilted by the control device, as required. Tilting of this type between an "on" and an "off" position, which can be controlled autonomously for each individual micromirror, is brought about by applying electrostatic fields. This allows a surprisingly fine and precise control of the light radiation or laser radiation.

Preferably, for each individual micromirror, two stable end states are defined, in this case, an "on" and an "off" position, between which the micromirror can switch frequently, in particular up to 5000 times within a single second. The "on" position describes the state in which the light energy is directed to the area to be exposed, while the "off" position describes the state in which the light energy is directed away from the exposure surface.

The edge length of these individual micromirrors of a DMD unit is preferably a few micrometers, in particular, approximately 16 µm. The number of mirrors within a DMD unit corresponds to the resolution of the projected image, i.e., in this case the desired resolution of the illuminated region, whereby preferably several pixels can also be represented by one micromirror.

In a preferred embodiment, the individual pixels can also be controlled at different, arbitrary brightness levels. This is achieved by controlling the individual micromirrors via a binary pulse width modulated control, i.e. a pulse density modulation. The brightness level of a pixel thus depends on how long a micromirror is switched on.

In a preferred embodiment, a color filter can be arranged in front of the DMD unit, i.e., in the projection path of the light radiation. It can for example filter out a wavelength from the deflected light or restrict the deflected light ray to one wavelength. It is also possible to use a monochromator instead of a color filter to spectrally isolate a specific wavelength from the incident beam.

A major advantage of this DLP technology comprising a DMD unit is the increased precision. The light energy, i.e. the light radiation, can be directed very precisely away from the areas of the lower surface of the light-transmissive film in which the material to be polymerized already has a desired degree of cure, so that overexposure is avoided.

In a preferred method, a process control method for a 3D-printing process such as a stereolithography process and/or a DLP (digital light processing) process is provided using a 3D printer including a build platform, a light source, a receiving device for printing material and a control device wherein an object is produced layer-wise or continuously from the printing material, wherein a thermal imaging camera, the output signal of which is transmitted to the control device, is connected to the 3D printer, the method including the following steps: illuminating selective positions of a layer or parts of the layer, detecting the temperature of the layer during polymerisation using the thermal imaging camera, ending a building process of a layer by ending the illumination, the time of the end of the illumination being established by reaching a predefined temperature Tmax or a predefined change in temperature dT/dt.

It is preferred that the predefined temperature Tmax is established as the maximum heating temperature detected at a surface of the polymerising layer by the thermal imaging camera and the change in temperature dT/dt is established as converging towards zero or is zero.

It is preferred that the thermal radiation of the layer is detected by a thermal imaging camera, the change in temperature dT/dt corresponding to a first derivative of a temperature curve, a positive change in temperature (dT/dt>0) indicating heating of a surface of the layer, a negative change in temperature (dT/dt<0) indicating cooling of the surface of the layer, and no change in temperature (dT/dt=0) indicating a constant temperature or a maximum/minimum of a temperature curve (Tmax or Tmin).

It is preferred that the receiving device includes a film, wherein a change in temperature over a surface of the film is detected in a spatially resolved manner by the thermal imaging camera and passed to the control device, wherein, after the illumination ends, the layer is detached from the film and the build platform is raised, new material to be polymerised arriving in a resulting gap, and the detachment of the object from the film being recognised by the thermal imaging camera as a large decrease in temperature (dT/dt<<0).

It is preferred that the receiving device comprises a film with an inhibitor layer, wherein, during the illumination, the build platform is raised continuously at a defined speed, such as, but not limited to, 0.5 mm/min, new material to be polymerised arriving in a resulting gap, and wherein an inhibitor layer prevents adhesion to the film.

It is preferred that the build platform is raised incrementally between the illumination times with a defined step height, such as, but not limited to, 0.3 to 3 cm, and subsequently lowered to a desired layer thickness, new material to be polymerised arriving in a resulting gap and being cured in the next illumination step.

It is preferred that the build platform is raised diagonally starting from one side or edge, to a height of 1 cm between the illumination times, and wherein the build platform is subsequently orientated substantially horizontally and subsequently lowered to the desired layer thickness.

It is preferred that the material flows with or without gas bubbles between the build platform and the film and is detected by the thermal imaging camera as a change in temperature (dT/dt>0 or dT/dt<0) in each case and recognised in the control device.

It is preferred that the wherein impurities due to sedimentation, contamination, adhesion of residues from any erroneous building process or of foreign particles on the film or inhibitor layer are detected by the thermal imaging camera and are recognised in the control device by an excessively low detected change in temperature, optionally during movement of the build platform.

It is preferred that the illumination process of a next step only starts when the thermal imaging camera records and the control device recognises that no gas bubble(s) or impurities have been left behind on the film.

It is preferred that the next step only starts when the thermal imaging camera records and the control device recognises that after a change in temperature exceeding a predetermined threshold no further change in temperature is measurable.

It is preferred that the control device outputs an error signal or warning signal when the thermal imaging camera records that the temperature distribution is not plausible over the entire film surface because gas bubbles or small impurities have been left behind on the film or an inhibitor layer on the film, between the object and the film or inhibitor layer.

It is preferred that the control device outputs an error signal or warning signal when the thermal imaging camera records and the control device detects that the thermal emission does not change within a predefined time, such as, but not limited to approximately 2 seconds at the start of the illumination.

It is preferred that the illumination process is delayed, paused, or aborted by the control device if the control device outputs a warning signal and subsequently the building process of the next layers is adapted or the previous illumination process is repeated.

It is preferred that the dimensions of each printed layer are tracked during polymerisation using multi-dimensional spatially resolved temperature measurement, such as but not limited to 2-dimensional spatially resolved temperature measurement, the dimensions of the illuminated layer being compared against the real dimensions of the preceding layer and against the theoretical dimensions of the object, the next layer being reduced if the size of the illuminated area decreases and enlarged if it increases.

In yet another preferred method, a process control method is provided for a 3D-printing process such as a stereolithography process and/or a DLP (digital light processing) process, using a 3D printer which comprises a build platform, a light source, a receiving device for printing material and a control device by which an object can be produced layer-wise or continuously from the printing material, wherein a thermal imaging camera and a digital micromirror device (DMD) unit are connected to the 3D printer, the output signal of the thermal imaging camera being transmitted to the control device and the DMD unit being controlled by the control device, wherein the method includes the following steps: illuminating a layer or parts of the layer positionally selectively, and detecting the temperature of the layer during the polymerisation using the thermal imaging camera. The radiation can be guided away from the layer to be illuminated and/or from already cured regions of the layer by the DMD unit controlled by the control device.

In another preferred embodiment, a computer program product is provided including program code which is stored on a non-transitory machine-readable medium, the machine-readable medium having computer instructions executable by a processor, which computer instructions cause the processor to perform the methods described above.

In a further preferred embodiment, a 3D printer is provided having a build platform, a light source, a receiving device for printing material, and a control device by which an object can be produced layer-wise or continuously from the printing material. A thermal imaging camera is connected to the 3D printer, the output signal of the thermal imaging camera is configured to be transmitted to the control device. The 3D printer is configured to perform the following steps: printing a layer of material, illuminating the layer of printing material, detecting a temperature of the layer during polymerisation using the thermal imaging camera, ending the building process of the layer by ending the illumination, the exact time of the end of the illumination being established by a predefined temperature or a predefined change in temperature being reached, which is assessed by the thermal imaging camera.

BRIEF DESCRIPTION OF THE DRAWINGS

Further advantages, details and features will be apparent from the following description of a plurality of embodiments of the invention with reference to the drawings, in which.

DETAILED DESCRIPTION

Figure 1:
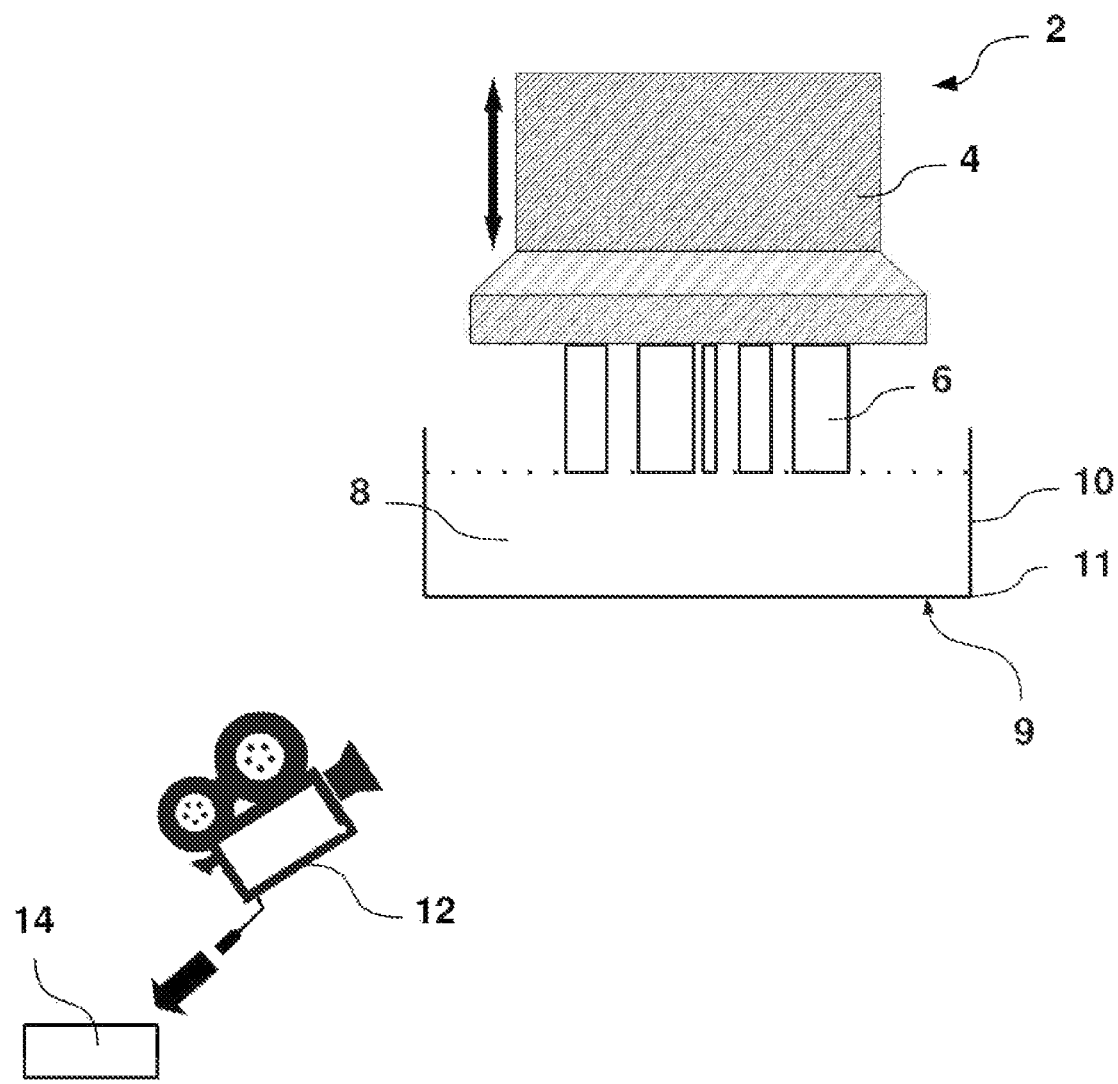
FIG. 1 is a schematic drawing of the lateral cross section of a 3D printer according to the invention in a first embodiment.

FIG. 1 is a schematic drawing of the lateral cross section of a 3D printer 2 according to the invention for a stereolithography process or digital light processing process, having a build platform 4, a receiving or holding device 10 for printing material 8, a thermal imaging camera 12 and a control device 14. In this embodiment, printing material 6 cured on the lower face of the build platform 4 is represented schematically. The cured printing material 6 can take on different forms depending on the printed object, and is represented here by columns of different thickness. Further, an arrow indicates the direction of movement of the build platform 4, which can be displaced vertically up and down.

Below the build platform 4, there is a receiving device 10 for printing material 8, the fill level of the printing material 8 being represented by a dashed line. The lower boundary 11 of the receiving device 10 consists of a transparent material, preferably a transparent film.

A thermal imaging camera 12 is directed onto the outer and lower surface 9 of this film 11, and is in turn connected to a control device 14. Using this thermal imaging camera 12, the temperature of the part of the surface 9 of the foil 11 to be inspected can be measured. For this purpose, the thermal imaging camera is directed onto or at the lower surface 9 of the very thin film 11, and the heat emission during and between illuminations is recorded. In this case, the part is a dental restoration and the area of the foil 11 to be monitored is approximately 5 cm×5 cm. The control device 14 can generate a 2-dimensional temperature distribution over the part of the surface 9 of the foil 11 to be checked from the data recorded by the thermal imaging camera 12, taking into account the thermal conductivity and thermal capacity of the materials used—the translucent foil 11 and the printing material 8.

In the event of abnormalities in the 2-dimensional temperature distribution between two or more layers and/or other unexpected changes in temperature, the control device 14 emits a signal to warn of errors. Possible errors include, for example, the absence of a sudden increase in heat emission when exposure is started, or the absence of a sudden decrease in temperature when the cured printing material is released from the film. It is also possible that upon comparison of the 2-dimensional temperature tracking, and thus the comparison of the illuminated and cured areas of two or more layers, an excessive area increase or decrease in the cured layer is recorded.

In the event that errors are recorded in the printing process, this can be optionally automatically adjusted by the control device 14. However, it is more common that if a warning signal is emitted, the control device 14 pauses the printing process until all errors have been eliminated by the user and the user triggers the printing process again.

Figure 2:
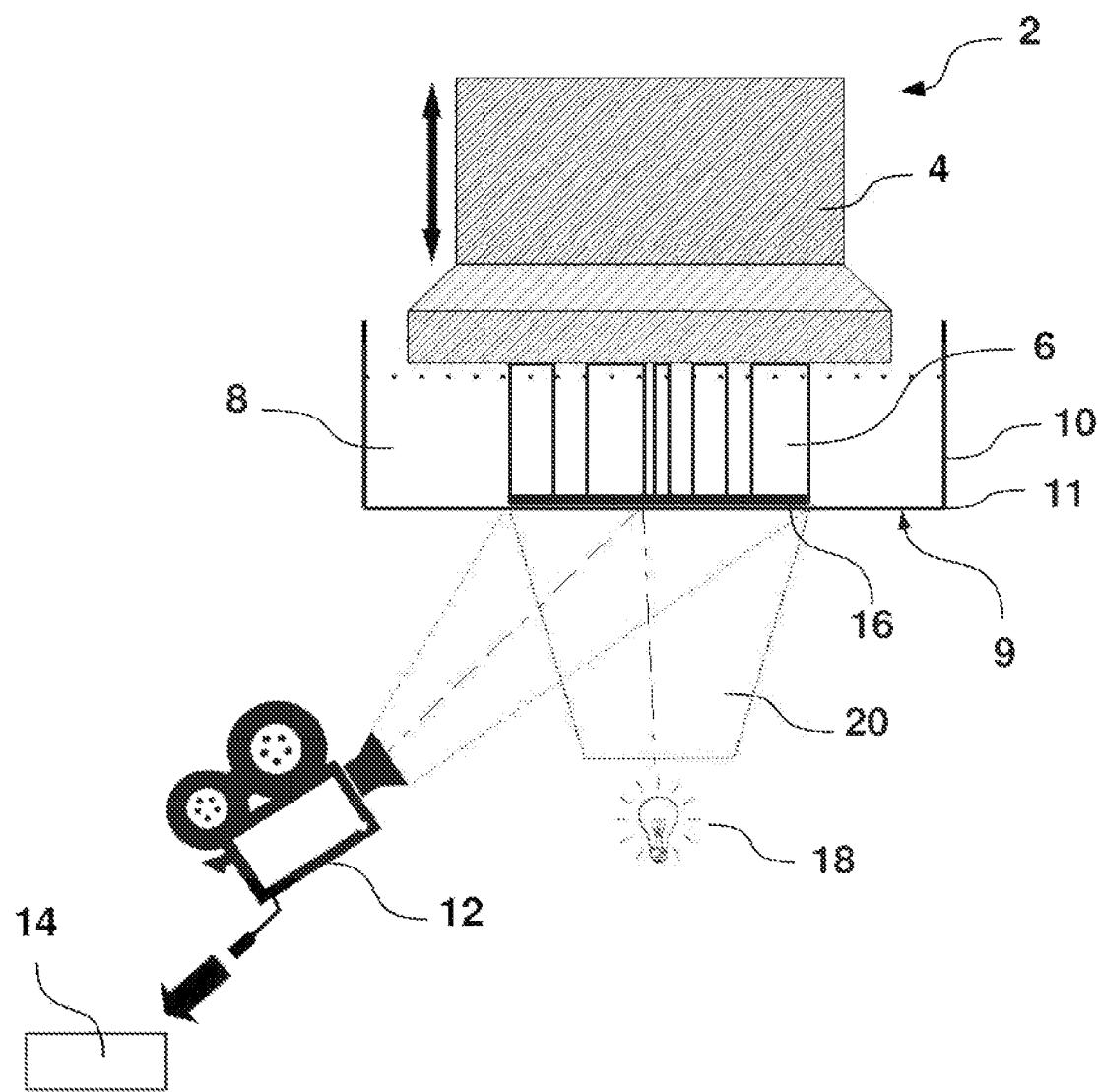
FIG. 2 is a schematic drawing of the lateral cross section of a further embodiment of a 3D printer according to the invention.

FIG. 2 shows a schematic representation of the lateral cross-section of a further embodiment of a 3D printer 2 according to the invention. Here, an active printing process, i.e., a layer being exposed, is shown by means of a 3D printer according to FIG. 2. The columns shown herein of the cured printing material 6, which are intended to represent schematically the already printed object, are immersed or dipped into the printing material 8. Centrally below the receiving device 10, a light source 18 having a conical illumination region 20 is schematically shown. A light source of this type may be a high-precision laser which emits the optimum wavelength as appropriate for the respective photoinitiator, or else preferably an LED light source. For simplicity, the entire possible detection region is shown here, although the capture may take place in a spatially resolved manner using a focus mark of for example 0.5 mm×0.5 mm. Between the already cured printing material 6 and the transparent film 11, newly cured material 16 is schematically shown.

For simplicity, conical illumination 20 is shown. However, it would also be possible to illuminate only the desired regions (1 pixel for example 20×20 μm) between the already cured material 6 and the transparent film 11 using a plurality of light sources, which illuminate smaller regions or appropriate deflection mirrors, optionally with a slight increase or decrease in area. In this embodiment, the thermal imaging camera 12 is only directed onto the illuminated region or exposed region of the film surface 9, even if this is not shown in detail in the drawings, and is focused and therefore only receives or records the heat emission of this small region. By way of illustration, this is shown using dot-dash lines. As a result of this concentration on the important region, i.e., the exact region of the 3D-printing process, it is possible to avoid unnecessarily large datasets and thus slow processing by the control device 14.

Figure 3:
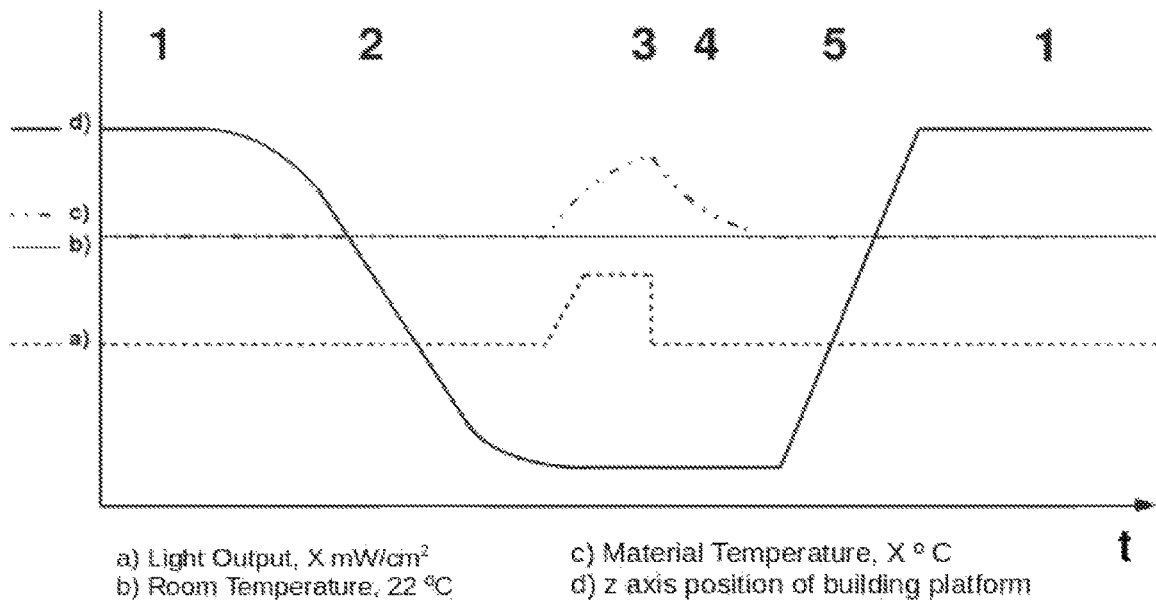
FIG. 3 is a schematic drawing of the light output, the temperature progression and the z-position of the build platform during the 3D-printing process.

FIG. 3 graphically displays the light output, the temperature progression and the z-position of the build platform 4, i.e., the internal vertical displacement of the build platform 4 with respect to the transparent film 11, during the 3D-printing process.

Line a) gives information about the light output of the light source 18 in [mW/cm$^2$]. When the light source 18 is switched on, the light output increases linearly with a steep gradient, optimally jumping up. During the illumination, the light output or power is kept constant and subsequently switched off, which results in a sudden drop in the light power.

Line b) shows the progression of the room temperature during the 3D-printing process. This should optimally be kept constant so as to avoid incorrect measurement of the temperature progression at the film surface 9.

Line c) shows an optimum temperature profile at the surface 9 of the transparent film 11 during the printing process. This temperature progression is recorded by the thermal imaging camera 12 and evaluated by the control device 14. The temperature increases at the time when the light source 18 is switched on. This is caused by the incident light power of the light source 18, as well as the onset of exothermic polymerization of the printing material 8. When the change in temperature dT/dt approaches a particular value as close as possible to zero, in particular a zero value, the maximum of the temperature during the polymerisation process $T_{max}$ is approximately reached. The value dT/dt=0 cannot be reached within a finite time, and therefore a value close to zero is resorted to in order to keep the illumination duration as short as possible and nevertheless to achieve appropriate curing of the printing material 8. At this point, the light source 18 is switched off and the temperature of the surface 9 of the transparent film 11 slowly returns to its initial value.

Line d) provides information about the z-position of the build platform 4, i.e., the internal vertical displacement of the build platform 4 with respect to the transparent film 11, during the progression of a 3D-printing process. The build platform 4 is moved or displaced close to the light-transmissive/transparent film 11 prior to exposure or illumination in order to achieve a defined gap of x mm (where x may be adapted depending on the requirements).

After completion of the exposure process, the build platform 4 is moved away from the film 11 again to achieve a detachment of the cured material 6 from the light-transmissive film 11.

Moreover, time periods 1 to 5 are marked in FIG. 3. These denote the individual stages of the 3D-printing process. Region 1 is the initial value and represents the starting position and the temperature without illumination or exposure. This point is optimally reached again for all of curves a) to d) after the printing process.

Region 2 shows the approach of the build platform 4 towards the transparent film 11. At this point, the light source 18 is switched off and the temperatures correspond to the starting value. At the end of region 2, i.e., when the build platform 4 is optimally approaching the film 11, the light source 18 is switched on and the polymerisation starts. This can be recognized by the beginning temperature increase of line c).

In region 3, the maximum heating temperature $T_{max}$ of the film surface 9 is reached during exposure. Here, the temperature change dT/dt approaches a certain value, in particular the value zero. When this value is reached, the light source 18 is switched off and the temperature of the surface 9 of the transparent film 11 starts to fall again.

Region 4 denotes the cooling process of the film surface 9, after the illumination has terminated and the polymerisation is thus ended. When the starting temperature of the film surface 9 is reached, time period 5 starts, at which point the build platform 4 travels back to its starting position and the polymerised printing material 6 is thus detached from the transparent film 11. At the end of region 5, all the parameters return to their initial values (region 1).

Figure 4:
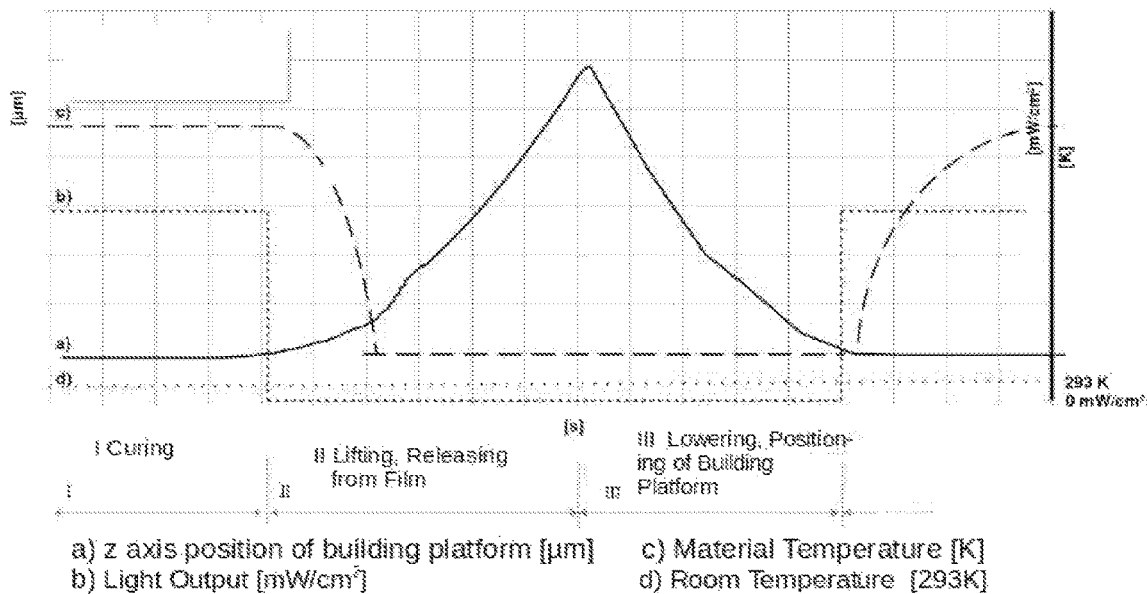
FIG. 4 is a further schematic drawing of the light output, the temperature progression and the z-position of the build platform during the 3D-printing process.

FIG. 4 shows a modified embodiment compared to that shown in FIG. 3. In this context, the light output, the temperature profile and the Z-position of the build platform 4, i.e., the internal vertical displacement of the build platform 4 with respect to the transparent film 11, during the 3D-printing process, are again graphically shown.

Compared to FIG. 3, the Z-position of the build platform 4 is different. Line a) shows the Z-position of the build platform 4, i.e., the internal vertical displacement of the build platform 4 with respect to the transparent film 11, during the progression of a 3D-printing process. The build platform 4 is moved away from the light-transmissive film 11 after curing (exposure) and then approached again to achieve a defined gap of x mm (x can be adjusted according to the requirements).

Line b) shows the progression of the light output 18 in mW/cm². When the light source 18 is switched on, the light output jumps up. While the build platform 4 is moving, the light source is switched off and thus has an output of 0 mW/cm². During illumination, the light power is kept constant.

Line c) shows, similarly to in FIG. 3, an optimum temperature progression at the surface 9 of the transparent film 11 during the printing process. The temperature increases at the time when the light source 18 is switched on and the build platform 4 is displaced in the Z-direction, and remains constant when a particular value is reached, in particular the temperature of the liquid printing material 8. If the light source is switched on again, the temperature increases again. This is caused by the incoming light output of the light source 18 and the onset of the exothermic polymerisation of the printing material 8. After the curing has ended, the temperature remains constant again (change in temperature dT/dt approaches a zero value). This corresponds to the maximum of the temperature during the polymerisation process $T_{max}$.

The room temperature (in this case line d)) during the 3D-printing process should be kept as constant as possible to avoid erroneous measurement of the temperature progression at the film surface 9.

Moreover, FIG. 4 shows time periods I to III. These denote the individual portions of the 3D-printing process.

Region I shows the Z-position of the build platform 4 during the illumination process. In this context, the light source 18 is switched on and the film surface 9 shows the maximum heating temperature $T_{max}$ reached during the illumination. The change in temperature dT/dt approaches a zero value here.

Region II shows the change in the Z-position of the build platform 4 between two illumination processes. The build platform 4 is raised. At the start of the movement of the build platform 4, the light source 18 is switched off, causing the temperature at the surface 9 of the transparent film 11 to decrease sharply and remain constant until the end of this region II when a certain temperature is reached, in particular the temperature of the liquid printing material 8.

Region III again shows the lowering of the Z-position of the build platform 4 at the start of an illumination progress. The light source is switched on again, in such a way that the temperature at the surface 9 of the transparent film 11 increases again. This is caused by the incoming light output of the light source 18 and the onset of the exothermic polymerisation of the printing material 8.

After the curing is complete, the temperature again takes on the constant value $T_{max}$ in accordance with region I (change in temperature dT/dt approaches a zero value). This indicates the end of the polymerisation process, so that the cycle can start again.

Figure 5:
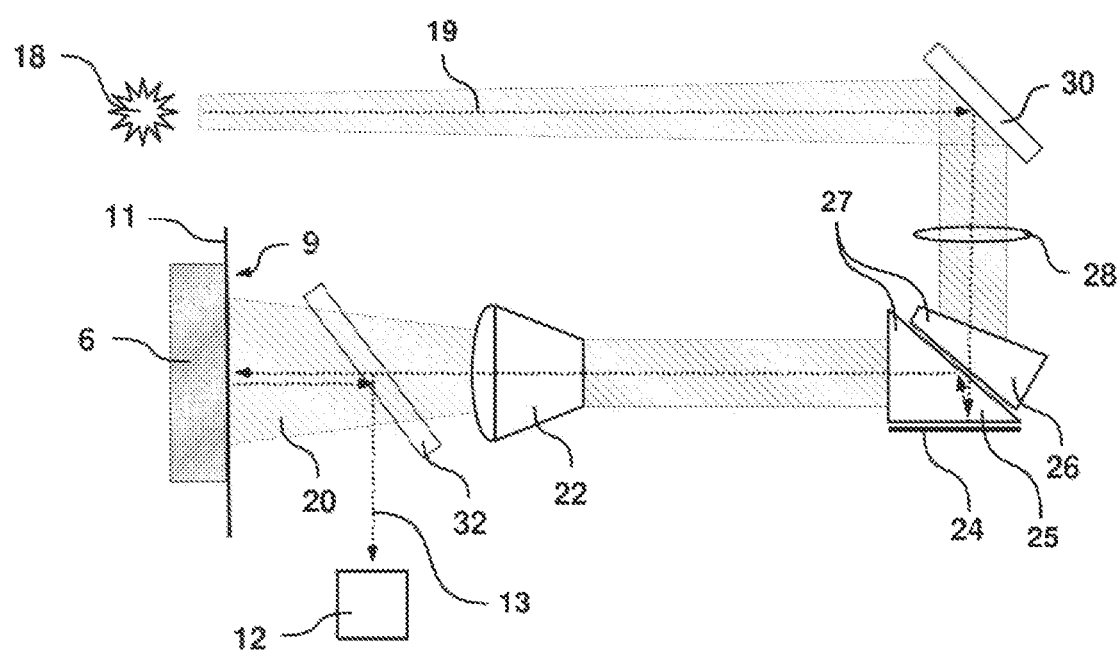
FIG. 5 is a schematic drawing of an optical construction of a further embodiment of a 3D printer according to the invention.

FIG. 5 is a schematic drawing of a further embodiment of a 3D printer 2 according to the invention. The special feature here is the optics or optical system used for guiding the light radiation towards the printed object or printing material 6, i.e., towards the surface 9 of the transparent film 11, and to guide the thermal or IR radiation from the printed object/printing material 6 towards the thermal imaging camera 12.

The light source 18 is located next to the object to be printed in this embodiment, and is shown above said object in FIG. 5. Radiation 19 exiting the light source 18 and used for illumination is deflected via a mirror 30 to a converging lens 28.

In an advantageous embodiment, the mirror 30 is designed with an edge filter, in such a way that the radiation 19 is reliably reflected but natural light can pass freely through the mirror. The lens 28 is suitable for converging and parallelizing the individual light rays of the illumination radiation 19, and optionally also the additional natural light radiation. The now parallel rays of the illumination radiation 19 are passed on from the (converging/collecting) lens 28 to two laminated prisms 25 and 26 and a DMD unit 24.

In this embodiment, the two prisms 25 and 26 together form a "Total Internal Reflection" prism (TIR prism) 27. Total Internal Reflection is a physical phenomenon occurring in waves, such as light rays, and occurs when light strikes a flat interface with another transparent medium in which the propagation speed of the light is greater than in the original medium. If the angle of incidence is varied continuously, this effect occurs relatively abruptly at a particular value of the angle of incidence. This specific angle of incidence is known as the critical angle of total internal reflection. The light mostly no longer passes over into the other medium, but instead is (more or less) totally reflected back into the starting medium from this angle onwards. The TIR prism, i.e., the optical element, which is composed of the two laminated prisms 25 and 26, can thus be used as a mirror. If the refractive index of the TIR prism 27 is high enough, total internal reflection (TIR) is achieved, and the TIR prism 27 acts like a mirror with 100% reflection.

As a combination of two laminated prisms 25 and 26, the TIR prism 27 deflects/directs the incident light onto the DMD unit 24, and the image to be produced is projected using the light ray reflected from the DMD unit 24. The use of a TIR prism 27 thus allows a considerable savings of space since the same effect could only be achieved with a highly complex combination of mirrors. Moreover, this greatly increases the contrast achieved by the system.

The radiation exiting the TIR prism continues onwards to a projection lens 22, which again splits the parallel rays of the illumination radiation 19 into a conical illumination region 20. For simplicity, a possible illumination region 20 is shown here, but the illumination may be spatially resolved using a focus mark of for example 0.5 mm×0.5 mm.

The radiation of the conical illumination region 20 is subsequently directed to a semi-transparent mirror 32, known as a splitter or divider mirror, through which the illumination radiation 19 can pass. Subsequently, the illumination radiation 19 is incident on a transparent film 11, and illuminates a desired region between said film and the already cured material 6. The resulting thermal radiation 13, i.e., the IR radiation, is emitted by the material 6 and guided back through the transparent film 11 to the semi-transparent mirror 32.

In an advantageous embodiment, the mirror 32 is formed as a splitter mirror, i.e., in such a way that the thermal radiation 13, i.e., the IR radiation, is re-reflected towards the thermal imaging camera 12, but the illumination radiation 19, for example UV radiation, can pass through the mirror unchanged.

For simplicity, a conical illumination region 20 is shown. However, by using a plurality of light sources which illuminate smaller regions, it is also possible to illuminate only the desired region or areas (1 pixel for example 20×20 μm) between the already cured material 6 and the transparent film 11, optionally with a slight increase or decrease in area.

In an advantageous embodiment, the DMD unit 24 can further switch individual pixels of the illumination region on or off depending on completeness of curing. This makes it possible to prevent overexposure of already cured regions.

In all places, the film can be light-transmissive, light transmitting, translucent or transparent. Illumination and exposure are interchangeable.

In some embodiments, the innovations may be implemented in diverse general-purpose or special-purpose computing systems. For example, the computing environment can be any of a variety of computing devices (e.g., desktop computer, laptop computer, server computer, tablet computer, gaming system, mobile device, programmable automation controller, etc.) that can be incorporated into a computing system comprising one or more computing devices.

In some embodiments, the computing environment includes one or more processing units and memory. The processing unit(s) execute computer-executable instructions. A processing unit can be a central processing unit (CPU), a processor in an application-specific integrated circuit (ASIC), or any other type of processor. In a multi-processing system, multiple processing units execute computer-executable instructions to increase processing power. A tangible memory may be volatile memory (e.g., registers, cache, RAM), non-volatile memory (e.g., ROM, EEPROM, flash memory, etc.), or some combination of the two, accessible by the processing unit(s). The memory stores software implementing one or more innovations described herein, in the form of computer-executable instructions suitable for execution by the processing unit(s).

A computing system may have additional features. For example, in some embodiments, the computing environment includes storage, one or more input devices, one or more output devices, and one or more communication connections. An interconnection mechanism such as a bus, controller, or network, interconnects the components of the computing environment. Typically, operating system software provides an operating environment for other software executing in the computing environment, and coordinates activities of the components of the computing environment.

The tangible storage may be removable or non-removable, and includes magnetic or optical media such as magnetic disks, magnetic tapes or cassettes, CD-ROMs, DVDs, or any other medium that can be used to store information in a non-transitory way and can be accessed within the computing environment. The storage stores instructions for the software implementing one or more innovations described herein.

Where used herein, the term "non-transitory" is a limitation on the computer-readable storage medium itself—that is, it is tangible and not a signal—as opposed to a limitation on the persistence of data storage. A non-transitory computer-readable storage medium does not necessarily store information permanently. Random access memory (which may be volatile, non-volatile, dynamic, static, etc.), read-only memory, flash memory, memory caches, or any other tangible, computer-readable storage medium, whether synchronous or asynchronous, embodies it.

The input device(s) may be, for example: a touch input device, such as a keyboard, mouse, pen, or trackball; a voice input device; a scanning device; any of various sensors; another device that provides input to the computing environment; or combinations thereof. The output device may be a display, printer, speaker, CD-writer, or another device that provides output from the computing environment.

The scope of protection of the present invention is given by the claims and is not limited by the features explained in the description or shown to the figures.

The invention claimed is:

1. A process control method for a 3D-printing process using a 3D printer which comprises a build platform, a light source, a receiving device for printing material and a control device wherein an object is produced layer-wise or continuously from the printing material, wherein a thermal imaging camera, the output signal of which is transmitted to the control device, is connected to the 3D printer, and the method comprising the following steps:
    illuminating selective positions of a layer or parts of the layer,
    detecting the temperature of the layer during polymerisation using the thermal imaging camera,
    ending a building process of a layer by ending the illumination, the time of the end of the illumination being established by reaching a predefined temperature $T_{max}$ or a predefined change in temperature dT/dt.

2. The method according to claim 1, wherein the predefined temperature $T_{max}$ is established as the maximum heating temperature detected at a surface of the layer by the thermal imaging camera and the change in temperature dT/dt is established as converging towards zero.

3. The method according to claim 1, wherein thermal radiation of the layer is detected by the thermal imaging camera, the change in temperature dT/dt of the layer corresponding to a first derivative of a temperature curve, a positive change in temperature (dT/dt>0) of the layer indicating heating of a surface of the layer, a negative change in temperature (dT/dt<0) of the layer indicating cooling of the surface of the layer, and no change in temperature (dT/dt=0) of the layer indicating a constant temperature or a maximum/minimum of a temperature curve ($T_{max}$ or $T_{min}$) of the layer.

4. The method according to claim 1, wherein the receiving device comprises a film, wherein a change in temperature over a surface of the film is detected in a spatially resolved manner by the thermal imaging camera and passed to the control device.

5. The method according to claim 1, wherein the receiving device comprises a film, wherein, after the illumination ends, the layer is detached from the film and the build platform is raised, new material to be polymerised arriving in a resulting gap, and the detachment of the object from the film being recognised by the thermal imaging camera as a decrease in temperature (dT/dt<<0).

6. The method according to claim 1, wherein the receiving device comprises a film with an inhibitor layer, wherein, during the illumination, the build platform is raised continuously at a defined speed, new material to be polymerised arriving in a resulting gap, and wherein the inhibitor layer prevents adhesion to the film.

7. The method according to claim 1, wherein the build platform is raised incrementally between the building process of the layers with a defined step height and subsequently lowered to a desired layer thickness, new material to be polymerised arriving in a resulting gap and being cured in the next building process of the layer.

8. The method according to claim 7, wherein the build platform is raised diagonally starting from one side or edge, to a height of 1 cm between the illumination times, and wherein the build platform is subsequently orientated horizontally and subsequently lowered to the desired layer thickness.

9. The method according to claim 1, wherein the printing material flows with or without gas bubbles between the build platform and the film and is detected by the thermal imaging camera as a change in temperature (dT/dt>0 or dT/dt<0) in each case and recognised in the control device.

10. The method according to claim 1, wherein the receiving device comprises a film with an inhibitor layer, wherein impurities due to sedimentation, contamination, adhesion of residues from any erroneous building process or of foreign particles on the film or inhibitor layer are detected by the thermal imaging camera and are recognised in the control device by a detected change in temperature, optionally during movement of the build platform.

11. The method according to claim 1, wherein the receiving device comprises a film, wherein the next building process step only starts when the thermal imaging camera records and the control device recognises that no gas bubble(s) or impurities have been left behind on the film.

12. The method according to claim 1, wherein the control device outputs an error signal or warning signal when the thermal imaging camera records and the control device detects that a thermal emission does not change within a predefined time at the start of the illumination.

13. The method according to claim 1, wherein the building process is delayed, paused, or aborted by the control device if the control device outputs a warning signal and wherein subsequently the building process of a next layer is adapted or the previous building process is repeated.

14. The method according to claim 1, wherein the dimensions of each printed layer are tracked during polymerisation using multi-dimensional spatially resolved temperature measurement, the dimensions of the illuminated layer being compared against the real dimensions of a preceding layer and against the theoretical dimensions of the object, a next layer being reduced if the size of the illuminated area decreases and enlarged if it increases.

15. The method according to claim 1, wherein the 3D-printing process comprises a stereolithography process and/or a DLP (digital light processing) process.

16. The method according to claim 2, wherein the change in temperature dT/dt is zero.

17. The method according to claim 6, wherein the defined speed comprises 0.5 mm/min.

18. The method according to claim 7, wherein the defined step height comprises around 0.3 to 3 cm.

19. The method according to claim 12, wherein the predefined time comprises approximately 2 seconds.

20. The method according to claim 14, wherein the multi-dimensional spatially resolved temperature measurement is 2-dimensional.

21. A process control method for a 3D-printing process using a 3D printer which comprises a build platform, a light source, a receiving device for printing material and a control device wherein an object is produced layer-wise or continuously from the printing material, wherein a thermal imaging camera, the output signal of which is transmitted to the control device, is connected to the 3D printer, and the method comprising the following steps:

illuminating selective positions of a layer or parts of the layer, detecting the temperature of the layer during polymerisation using the thermal imaging camera, ending a building process of a layer by ending the illumination, the time of the end of the illumination being established by reaching a predefined temperature $T_{max}$ or a predefined change in temperature $dT/dt$, wherein the next building process step only starts when the thermal imaging camera records and the control device recognises that after a change in temperature exceeding a predetermined threshold no further change in temperature is measurable.

22. A process control method for a 3D-printing process using a 3D printer which comprises a build platform, a light source, a receiving device for printing material and a control device wherein an object is produced layer-wise or continuously from the printing material, wherein a thermal imaging camera, the output signal of which is transmitted to the control device, is connected to the 3D printer, and the method comprising the following steps:

illuminating selective positions of a layer or parts of the layer, detecting the temperature of the layer during polymerisation using the thermal imaging camera, ending a building process of a layer by ending the illumination, the time of the end of the illumination being established by reaching a predefined temperature $T_{max}$ or a predefined change in temperature $dT/dt$, wherein the receiving device comprises a film, wherein the control device outputs an error signal or warning signal when the thermal imaging camera records that the temperature distribution is not plausible over the entire film surface because gas bubbles or impurities have been left behind on the film or an inhibitor layer on the film, between the object and the film or inhibitor layer.

* * * * *